United States Patent
Azizan et al.

(10) Patent No.: US 12,136,840 B2
(45) Date of Patent: Nov. 5, 2024

(54) DEVICE, BATTERY AND SYSTEM TO CONTROL BATTERY POWER

(71) Applicant: MOTOROLA SOLUTIONS, INC., Chicago, IL (US)

(72) Inventors: Muhamad Ridzuan Azizan, Penang (MY); Kow Chee Chong, Penang (MY); Macwien Krishnamurhti, Penang (MY); Wai Mun Lee, Penang (MY); Chen Kok Yeoh, Penang (MY); Yik Chuang Joseph Ting, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 545 days.

(21) Appl. No.: 17/561,779

(22) Filed: Dec. 24, 2021

(65) Prior Publication Data
US 2023/0208163 A1 Jun. 29, 2023

(51) Int. Cl.
*H01M 10/46* (2006.01)
*H01M 10/0525* (2010.01)
(Continued)

(52) U.S. Cl.
CPC ....... *H02J 7/0036* (2013.01); *H01M 10/0525* (2013.01); *H01M 10/425* (2013.01);
(Continued)

(58) Field of Classification Search
CPC .... H02J 7/0036; H02J 7/00032; H02J 7/0047; H02J 2207/20; H02J 7/0031;
(Continued)

(56) References Cited

U.S. PATENT DOCUMENTS 4,820,965 A * 4/1989 Siemer ................ H02J 7/00304
320/DIG. 33
4,992,340 A * 2/1991 Tidwell ................ H02J 7/0047
429/61

(Continued)

FOREIGN PATENT DOCUMENTS

WO WO-2014148228 A1 * 9/2014 ............ H01M 10/42

OTHER PUBLICATIONS

Krishnamurhti, Macwien; Chong, Kow Chee; Azizan, Muhamad Ridzuan; Saad, Md Reduan Md; Y Eoh, Chen Kok"Battery Protection Circuit and Method", unpublished US Patent Application having U.S. Appl. No. 17/303,961, filed Jun. 11, 2021.

*Primary Examiner* — John T Trischler
*Assistant Examiner* — Mary G Bartlett
(74) *Attorney, Agent, or Firm* — PERRY + CURRIER, INC.

(57) ABSTRACT

A system comprises a battery and a battery-powered device. Battery contacts and a data interface are therebetween. The battery includes low-power and high-power circuits to output power, from a cell, to the battery-powered device via the contacts. The high-power circuit outputs power higher than the low-power circuit. A switch(es) connects and disconnects the high-power circuit to/from the contacts, the low-power circuit connected to the contacts when the switch disconnects the high-power circuit. A voltage detector: detects a battery-voltage on the contacts and an output voltage on the data interface; when the output voltage is greater than the battery-voltage, controls the switch to connect the high-power circuit to the contacts; and when the output voltage is below the battery-voltage, controls the switch to disconnect the high-power circuit from the contacts. The battery-powered device provides the output volt- (Continued)

age on the data interface as powered from the contacts by the battery.

15 Claims, 5 Drawing Sheets

(51) Int. Cl.
*H01M 10/42* (2006.01)
*H01M 10/48* (2006.01)
*H01M 50/298* (2021.01)
*H02J 7/00* (2006.01)

(52) U.S. Cl.
CPC ............ *H01M 10/46* (2013.01); *H01M 10/48* (2013.01); *H01M 50/298* (2021.01); *H02J 7/00032* (2020.01); *H02J 7/0047* (2013.01); *H01M 2220/30* (2013.01); *H02J 2207/20* (2020.01)

(58) Field of Classification Search
CPC ........... H01M 10/0525; H01M 10/425; H01M 10/46; H01M 10/48; H01M 2220/30; H01M 50/569
USPC ........................................................ 320/107
See application file for complete search history.

(56) References Cited

U.S. PATENT DOCUMENTS

| | | | | |
|---|---|---|---|---|
| 5,608,304 A * | 3/1997 | Okumura | .............. | H02J 7/0031 320/152 |
| 5,783,322 A * | 7/1998 | Nagai | .................. | H01M 10/48 429/61 |
| 5,963,019 A * | 10/1999 | Cheon | ...................... | H02H 7/18 320/134 |
| 6,043,627 A * | 3/2000 | Doura | ................. | H02J 7/0014 320/134 |
| 6,127,801 A * | 10/2000 | Manor | ................ | H04M 1/0262 320/112 |
| 6,137,280 A * | 10/2000 | Ackermann | ........ | H02M 3/1582 324/426 |
| 6,173,350 B1 * | 1/2001 | Hudson | ...................... | G06F 1/28 710/240 |
| 6,208,117 B1 * | 3/2001 | Hibi | ...................... | H02J 7/0014 320/136 |
| 6,265,848 B1 * | 7/2001 | Mukainakano | ....... | H02J 7/0047 320/132 |
| 6,489,749 B1 * | 12/2002 | Nakashimo | ............. | H02J 9/005 320/136 |
| 6,605,925 B2 * | 8/2003 | Tange | .................... | H02J 7/0031 320/134 |
| 6,804,100 B2 * | 10/2004 | Astala | ................. | H02J 7/00308 361/18 |
| 6,879,133 B1 * | 4/2005 | Geren | .................... | H02J 7/0031 320/134 |
| 7,068,012 B1 * | 6/2006 | Geren | ................. | H01M 50/581 320/136 |
| 7,725,137 B2 * | 5/2010 | Lee | .......................... | H02H 7/18 455/343.1 |
| 7,737,658 B2 * | 6/2010 | Sennami | ............... | H02J 7/0068 320/112 |
| 8,098,056 B2 * | 1/2012 | Yamazaki | ............. | H02M 3/157 323/224 |
| 8,148,946 B2 * | 4/2012 | Takeda | ................ | H01M 10/486 320/155 |
| 8,305,725 B2 | 11/2012 | Ooi et al. | | |
| 8,738,952 B1 * | 5/2014 | Lachwani | .............. | G06F 1/3287 713/323 |
| 9,300,158 B2 * | 3/2016 | Kerfoot, Jr. | ............... | H02J 7/00 |
| 9,337,667 B2 * | 5/2016 | Arendell | ............ | H01M 50/202 |
| 9,503,558 B1 * | 11/2016 | Krishnamurthi | .... | H04M 1/0262 |
| 9,509,152 B2 | 11/2016 | Peh et al. | | |
| 9,606,188 B2 * | 3/2017 | Noda | .................... | G01R 31/382 |
| 9,812,878 B1 * | 11/2017 | Stieber | .................... | H02J 7/007 |
| 10,141,756 B1 * | 11/2018 | Venkatasamy | .... | H02J 7/007182 |
| 10,177,559 B2 * | 1/2019 | Uesugi | .................. | H02J 7/0031 |
| 10,177,560 B2 * | 1/2019 | Yamamoto | ......... | G01R 31/3842 |
| 10,193,361 B2 * | 1/2019 | Arendell | ............. | H02J 7/00308 |
| 10,250,059 B2 * | 4/2019 | Aldehayyat | ........... | H02J 7/0068 |
| 10,283,975 B1 * | 5/2019 | Venkatasamy | ........ | H02J 7/0048 |
| 10,431,995 B2 * | 10/2019 | Moritomo | ............. | H02J 7/0071 |
| 10,464,507 B2 * | 11/2019 | Yang | ..................... | B63H 21/00 |
| 10,942,499 B2 * | 3/2021 | Kumar Kn | .......... | G05B 19/042 |
| 10,992,164 B2 * | 4/2021 | Lebreux | .............. | H02J 7/0031 |
| 11,088,531 B2 | 8/2021 | Azizan et al. | | |
| 11,108,253 B2 | 8/2021 | Abdullah et al. | | |
| 11,482,764 B2 * | 10/2022 | Suzuki | ...................... | H02J 7/00 |
| 11,502,520 B2 * | 11/2022 | Azizan | ............... | G01R 19/0092 |
| 11,539,312 B2 * | 12/2022 | Yamato | .................. | H02P 5/685 |
| 11,575,161 B2 * | 2/2023 | Watanabe | ........... | H02J 7/00304 |
| 11,936,060 B1 * | 3/2024 | Schroeder | ........... | H01M 50/296 |
| 2001/0021092 A1 * | 9/2001 | Astala | .................. | H02J 7/00308 361/103 |
| 2002/0109486 A1 * | 8/2002 | Tange | ..................... | H02J 7/0031 320/162 |
| 2005/0162131 A1 * | 7/2005 | Sennami | ............... | H01M 50/269 320/128 |
| 2006/0121956 A1 * | 6/2006 | Lee | ..................... | H04M 1/0262 455/574 |
| 2007/0145827 A1 * | 6/2007 | Paik | .......................... | H02J 9/06 307/43 |
| 2008/0203971 A1 * | 8/2008 | Sakurai | ................. | H02J 7/0034 320/134 |
| 2008/0258691 A1 * | 10/2008 | Lai | ...................... | H02J 7/00304 361/86 |
| 2009/0111005 A1 * | 4/2009 | Hur | ...................... | H02J 7/0031 429/61 |
| 2009/0124299 A1 * | 5/2009 | Suzuki | .................. | H02J 7/0031 320/153 |
| 2009/0256526 A1 * | 10/2009 | Imai | ...................... | H02H 9/001 320/135 |
| 2009/0309547 A1 * | 12/2009 | Nakatsuji | ................... | H02J 7/06 320/164 |
| 2010/0013394 A1 * | 1/2010 | West | ...................... | H02J 7/0029 361/88 |
| 2010/0085020 A1 * | 4/2010 | Suzuki | ...................... | B25F 5/00 320/157 |
| 2010/0127663 A1 * | 5/2010 | Furukawa | ........... | H02J 7/00304 320/134 |
| 2010/0314945 A1 * | 12/2010 | Yamazaki | ............. | H02M 3/158 307/80 |
| 2011/0045323 A1 * | 2/2011 | Ooi | ..................... | H01M 50/209 429/61 |
| 2011/0093840 A1 * | 4/2011 | Pynenburg | .......... | H02J 7/00036 320/107 |
| 2011/0197389 A1 * | 8/2011 | Ota | ........................ | H02J 7/0045 429/121 |
| 2011/0273137 A1 * | 11/2011 | Nakatsuji | .................. | H02H 3/05 361/86 |
| 2012/0032645 A1 * | 2/2012 | Matsuura | ............ | H02J 7/00304 320/134 |
| 2012/0037385 A1 * | 2/2012 | Suzuki | ...................... | B25F 5/02 173/2 |
| 2013/0049675 A1 * | 2/2013 | Minami | .................. | G06F 1/263 320/103 |
| 2013/0057068 A1 * | 3/2013 | Lin | .......................... | H02J 7/342 307/23 |
| 2013/0057221 A1 * | 3/2013 | Shibata | ................ | H02J 7/00306 320/136 |
| 2013/0106320 A1 * | 5/2013 | Yugo | ..................... | B60L 58/14 318/139 |
| 2013/0113430 A1 * | 5/2013 | Kim | ...................... | H02J 7/0032 320/136 |
| 2013/0221924 A1 * | 8/2013 | Sim | ...................... | H02J 7/0063 320/112 |
| 2013/0335013 A1 * | 12/2013 | Suzuki | ............... | H01M 50/213 307/154 |
| 2014/0019074 A1 * | 1/2014 | Noda | ..................... | G01R 31/382 324/426 |

(56) References Cited

U.S. PATENT DOCUMENTS

| | | | |
|---|---|---|---|
| 2014/0062387 A1* | 3/2014 | Kim | H02J 7/0036 320/137 |
| 2014/0082379 A1* | 3/2014 | Nambi | G06F 1/263 713/300 |
| 2014/0117751 A1* | 5/2014 | Gillberg | F02D 41/20 307/9.1 |
| 2014/0132223 A1* | 5/2014 | Kerfoot, Jr. | G01R 31/386 320/136 |
| 2014/0239895 A1* | 8/2014 | Arendell | H01M 10/425 320/112 |
| 2014/0247015 A1* | 9/2014 | Hsu | H02J 7/00 320/128 |
| 2015/0147983 A1* | 5/2015 | Kerfoot, Jr. | H04B 1/3883 320/136 |
| 2015/0188346 A1* | 7/2015 | Oku | H02J 7/00047 320/138 |
| 2015/0200535 A1* | 7/2015 | Uesugi | H02H 7/18 361/91.1 |
| 2015/0333301 A1* | 11/2015 | Ota | H01M 50/244 429/91 |
| 2015/0340894 A1* | 11/2015 | Horie | H02J 7/00302 320/107 |
| 2016/0036260 A1* | 2/2016 | Nunez | H02J 7/007184 320/136 |
| 2016/0049636 A1* | 2/2016 | Takano | H01M 10/48 429/61 |
| 2016/0049815 A1* | 2/2016 | Wu | H02J 7/0031 320/134 |
| 2016/0219664 A1* | 7/2016 | Ellenberger | H05B 45/375 |
| 2016/0301223 A1* | 10/2016 | Kondo | H02J 7/0029 |
| 2016/0360022 A1* | 12/2016 | Krishnamurthi | H04M 1/72409 |
| 2017/0125999 A1* | 5/2017 | Yamamoto | H02H 7/18 |
| 2017/0126029 A1* | 5/2017 | Moritomo | H02J 7/0071 |
| 2017/0225585 A1* | 8/2017 | Saigo | B60L 58/21 |
| 2017/0331304 A1* | 11/2017 | Arendell | H02J 7/00308 |
| 2018/0083470 A1* | 3/2018 | Aldehayyat | H02M 3/1582 |
| 2018/0191172 A1* | 7/2018 | Melin | H02J 7/00 |
| 2018/0191177 A1* | 7/2018 | Sundaraaman | H01M 10/486 |
| 2018/0191179 A1* | 7/2018 | Yi | H02J 7/00719 |
| 2018/0262023 A1* | 9/2018 | Li | H02J 7/007182 |
| 2018/0269695 A1* | 9/2018 | Matsushita | H02J 7/0031 |
| 2018/0277801 A1* | 9/2018 | Brozek | H01M 10/441 |
| 2018/0309284 A1* | 10/2018 | Arendell | H02H 7/18 |
| 2018/0337536 A1* | 11/2018 | Li | H02J 7/00 |
| 2019/0056457 A1* | 2/2019 | Li | H01M 10/482 |
| 2019/0056708 A1* | 2/2019 | Kumar Kn | G05B 19/0425 |
| 2019/0068178 A1* | 2/2019 | Wang | H03K 5/1252 |
| 2019/0115630 A1* | 4/2019 | Roohparvar | H01M 6/5011 |
| 2019/0135127 A1* | 5/2019 | Ooi | H02J 7/00306 |
| 2019/0229377 A1* | 7/2019 | Kim | B60L 50/64 |
| 2019/0237715 A1* | 8/2019 | Seman, Jr. | H02J 7/0068 |
| 2019/0252891 A1* | 8/2019 | Ploeg | H02J 7/00036 |
| 2019/0326648 A1* | 10/2019 | Lee | G01R 19/16542 |
| 2019/0379219 A1* | 12/2019 | Snyder | H02J 7/00304 |
| 2019/0379228 A1* | 12/2019 | Nandimandalam Venkata | H02M 3/1584 |
| 2019/0393707 A1* | 12/2019 | Hunter | H02J 7/00714 |
| 2020/0106081 A1* | 4/2020 | Suzuki | H01M 10/44 |
| 2020/0203965 A1* | 6/2020 | Abdullah | G06F 1/3296 |
| 2020/0333865 A1* | 10/2020 | Lee | G06F 1/3206 |
| 2020/0375068 A1* | 11/2020 | Scherler | H05K 7/20163 |
| 2020/0379050 A1* | 12/2020 | Imanaka | H02J 7/0047 |
| 2020/0381930 A1* | 12/2020 | Kano | H02J 7/00036 |
| 2021/0044222 A1* | 2/2021 | Yamato | B60S 1/08 |
| 2021/0075206 A1* | 3/2021 | Azizan | H02H 1/04 |
| 2021/0075243 A1* | 3/2021 | Uesugi | H01M 10/425 |
| 2021/0086284 A1* | 3/2021 | Renner | B23K 9/1043 |
| 2021/0104886 A1* | 4/2021 | Lee | H02H 11/006 |
| 2021/0119274 A1* | 4/2021 | Watanabe | H02J 7/00304 |
| 2021/0194721 A1* | 6/2021 | Lee | H04L 25/0266 |
| 2021/0249886 A1* | 8/2021 | Moon | H01M 10/425 |
| 2021/0265847 A1* | 8/2021 | Azizan | H02J 7/0029 |
| 2021/0336459 A1* | 10/2021 | Inai | H02J 7/0048 |
| 2022/0200271 A1* | 6/2022 | Lee | H02H 9/02 |
| 2022/0263324 A1* | 8/2022 | Sun | H02J 7/0016 |
| 2022/0399614 A1* | 12/2022 | Azizan | H01M 10/425 |
| 2023/0101116 A1* | 3/2023 | Li | H04W 52/241 |
| 2023/0144351 A1* | 5/2023 | Park | H01M 10/4264 320/166 |
| 2023/0333175 A1* | 10/2023 | Hwang | H02J 7/0016 |
| 2023/0395876 A1* | 12/2023 | Hibbard | B60L 58/26 |
| 2024/0065344 A1* | 2/2024 | Aoyama | H02J 7/0042 |
| 2024/0120757 A1* | 4/2024 | Pauken | H02J 3/32 |
| 2024/0175937 A1* | 5/2024 | Hwang | H02J 7/0031 |
| 2024/0178467 A1* | 5/2024 | Chinen | H01M 10/48 |
| 2024/0186602 A1* | 6/2024 | Nguyen | H01M 50/572 |
| 2024/0243590 A1* | 7/2024 | Badash | H02J 7/0024 |

* cited by examiner

US 12,136,840 B2

DEVICE, BATTERY AND SYSTEM TO CONTROL BATTERY POWER

BACKGROUND OF THE INVENTION

It is challenging, if often dangerous, to change batteries of battery-powered devices, such as radios, in certain hazardous locations (e.g., locations that contain dust and/or suspended dust, such as mines, and the like). In particular, there is a risk that sparks may occur when battery contacts of a battery and a battery-powered device are adjacent, and/or connect, and ignite the dust.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
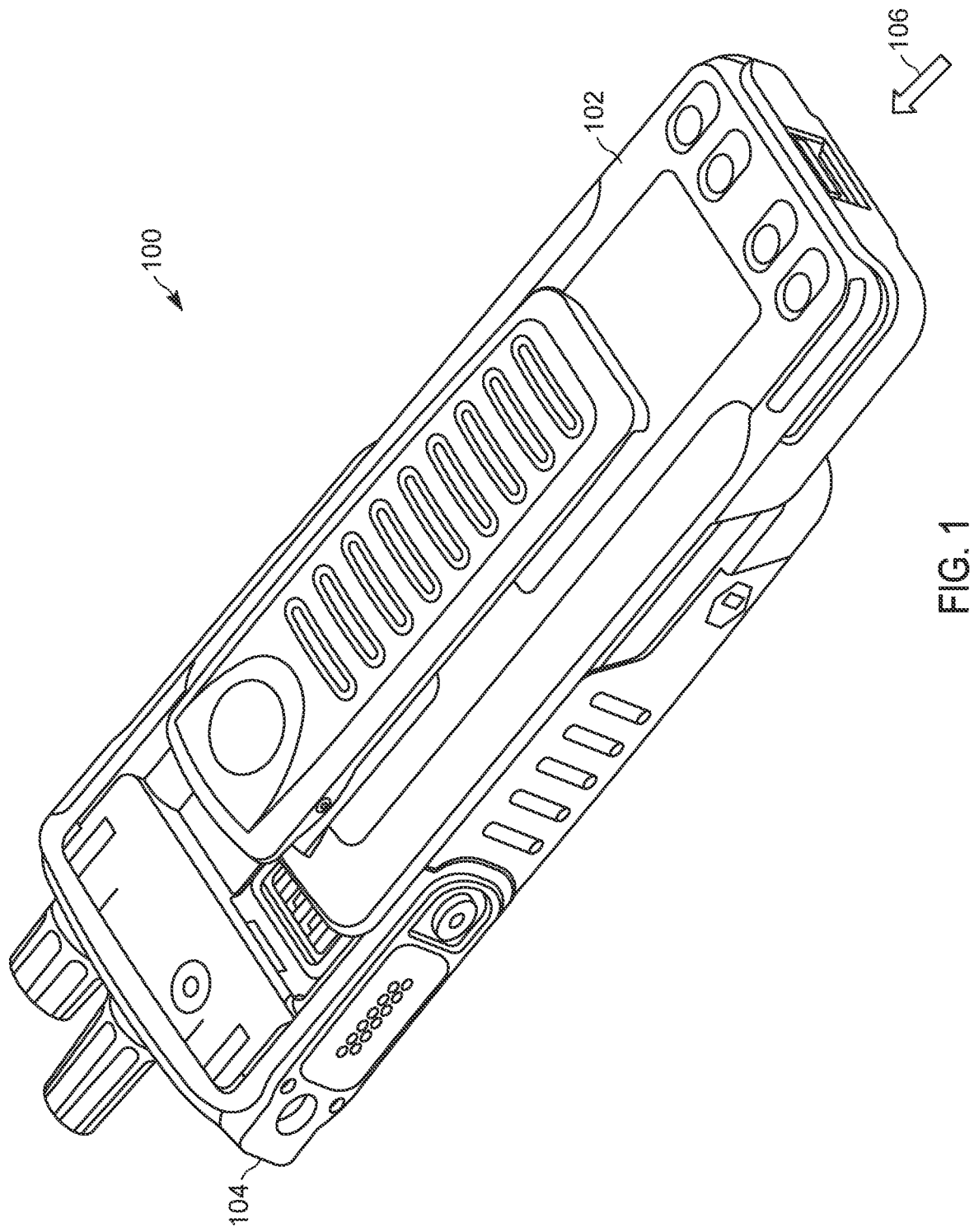
FIG. 1 depicts a system that includes a battery and a battery-powered device, each configured to control power output by the battery, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

It is challenging, if often dangerous, to change batteries of battery-powered devices, such as radios, in certain hazardous locations (e.g., locations that contain dust and/or suspended dust, such as mines, and the like). In particular, there is a risk that sparks may occur when battery contacts of a battery and a battery-powered device are adjacent, and/or connect, and ignite the dust. Hence, many battery-powered devices used in hazardous locations, such as HAZLOC (hazardous location) radios, have an associated specification that indicates that batteries cannot be changed while in use in hazardous locations. Hence, when a battery is low on power while in use with a HAZLOC radio in a hazardous location, an operator must leave the hazardous location to change the battery. Thus, there exists a need for an improved system of a battery and a battery-powered device to control power at the battery.

In particular, a system is provided herein which includes a battery and a battery-powered device, such as a HAZLOC radio, which include respective components to control power output from the battery, for example, when the battery is being connected to the battery-powered device via respective battery contacts and respective data interfaces. In particular, the battery includes a high-power circuit, a low-power circuit, and a switch to connect and disconnect the high-power circuit to the battery contacts. The low-power circuit is generally connected to the battery contacts when the switch disconnects the high-power circuit from the battery contacts. The high-power circuit disconnected from the battery contacts may be a default state of the battery such that, when the battery is inserted into the battery-powered device, the low-power circuit provides power to the battery contacts. The current of power output by the low-power circuit may generally be below a given current, such as less than 250 mA, which is selected to prevent, or eliminate, sparking at the battery contacts, for example in the presence of dust. Hence, when the battery is inserted into the battery-powered device, sparking does not occur, and/or the likelihood of such sparking is reduced, and the battery may be inserted into the battery-powered device in a hazardous location. However, the battery should then supply a higher power to the battery-powered device via the high-power circuit (e.g. once connected to the battery-powered device) to power the radio.

As such, the battery further includes a voltage detector, connected to the data interface, which is configured to control the switch. The voltage detector generally detects an output voltage on the data interface, as output from the battery-powered device. When the output voltage on the data interface is greater than the battery voltage at the battery contacts, the voltage detector controls the switch to connect the high-power circuit to the battery contacts. Conversely, when the output voltage is less than the battery voltage, the voltage detector controls the switch to disconnect the high-power circuit from the battery contacts.

To supply the output voltage on the data interface, that is greater than the battery voltage, for detection by the voltage detector, the battery-powered device comprises voltage step-up circuitry connected to the data interface and which receives power from the battery via the battery contacts. When the battery-powered device comprises a radio, the voltage step-up circuitry may include, but is not limited to, a charge pump that is generally to provide power to a frequency generating unit (FGU) for radio frequency synthesis at the radio. When the battery is inserted into the battery-powered device, the voltage step-up circuitry is powered from the battery, via the low-power circuit, at a battery voltage that it is at a current that is low enough to prevent sparking at the battery contacts.

However, an output voltage by the voltage step-up circuitry, at the battery-powered device, is generally provided to the data interface for detection by the voltage detector, the output voltage greater than the battery voltage. The voltage detector detects this output voltage, compares the output voltage to the battery voltage and, when the output voltage is greater than the battery voltage, controls the switch to connect the high-power circuit to the battery contacts, thereby powering the battery-powered device. As such, switching the high-power circuit to connect to the battery contacts occurs after the battery is inserted into the battery-powered device, and after the battery contacts and the data interface of battery and the battery-powered device connect, which generally prevents, and/or reduces the likelihood, of sparking, and which may enable changing of the battery in a hazardous location.

An aspect of the present specification provides a system comprising: a battery, a battery-powered device, and an interface therebetween comprising battery contacts and a data interface, the battery comprising: a cell; a low-power circuit to output power, from the cell, to the battery-powered device via the battery contacts; a high-power circuit to output a higher power to the battery contacts, relative to the low-power circuit; at least one switch to connect and disconnect the high-power circuit to the battery contacts, the low-power circuit connected to the battery contacts when the at least one switch disconnects the high-power circuit from the battery contacts; and a voltage detector to: detect a battery voltage on the battery contacts; detect, from the battery-powered device, an output voltage on the data interface; when the output voltage is greater than the battery voltage, control the at least one switch to connect the high-power circuit to the battery contacts; and when the output voltage is below the battery voltage, control the at least one switch to disconnect the high-power circuit from the battery contacts, the battery-powered device comprising: voltage step-up circuitry to: receive, on the battery contacts, power from the low-power circuit at the battery voltage; and output the output voltage, greater than the battery voltage, on the data interface for detection by the voltage detector.

Another aspect of the present specification provides a battery comprising: battery contacts; a data interface; a cell; a low-power circuit to output power from the cell via the battery contacts; a high-power circuit to output a higher power to the battery contacts, relative to the low-power circuit; at least one switch to connect and disconnect the high-power circuit to the battery contacts, the low-power circuit connected to the battery contacts when the at least one switch disconnects the high-power circuit from the battery contacts; and a voltage detector to: detect a battery voltage on the battery contacts; detect an output voltage on the data interface; when the output voltage is greater than the battery voltage, control the at least one switch to connect the high-power circuit to the battery contacts; and when the output voltage is below the battery voltage, control the at least one switch to disconnect the high-power circuit from the battery contacts.

Yet another aspect of the present specification provides a battery-powered device comprising: battery contacts; a data interface; and voltage step-up circuitry to: receive, on the battery contacts, power at a battery voltage; and output an output voltage, greater than the battery voltage, on the data interface.

Each of the above-mentioned aspects will be discussed in more detail below, starting with example system and device architectures of the system, in which the embodiments may be practiced, followed by an illustration of processing blocks for achieving an improved system of a battery and a battery-powered device to control power at the battery.

Further advantages and features consistent with this disclosure will be set forth in the following detailed description, with reference to the drawings.

Attention is directed to FIG. 1, which depicts a perspective view of an example system 100 that includes a battery 102 and a battery-powered device 104. The battery-powered device 104 is interchangeably referred to hereafter as the device 104. While as depicted the battery 102 and the device 104 are separate from one another, the battery 102 and the device 104 are generally configured to mate such that the battery 102 powers the device 104, as described in more detail below. For example, as depicted, and as indicated via the arrow 106, the battery 102 is being inserted into the device 104.

As depicted, the device 104 comprises a hazardous location (HAZLOC) radio, and the battery 102 comprise a HAZLOC battery, for use in mines and/or other hazardous locations where sparks, and the like, may cause explosions, and the like. As will be described below, both the battery 102 and the device 104 are generally adapted to control power output by the battery 102, when the device 104 is used with the battery 102, for example to prevent, and/or reduce the likelihood, of sparking when the battery 102 is connected and disconnected from the device 104.

Furthermore, the device 104 may not be a radio, but may be any type of device powered by the battery 102 and/or another battery, for use in hazardous locations and/or for use in non-hazardous locations.

Figure 2:
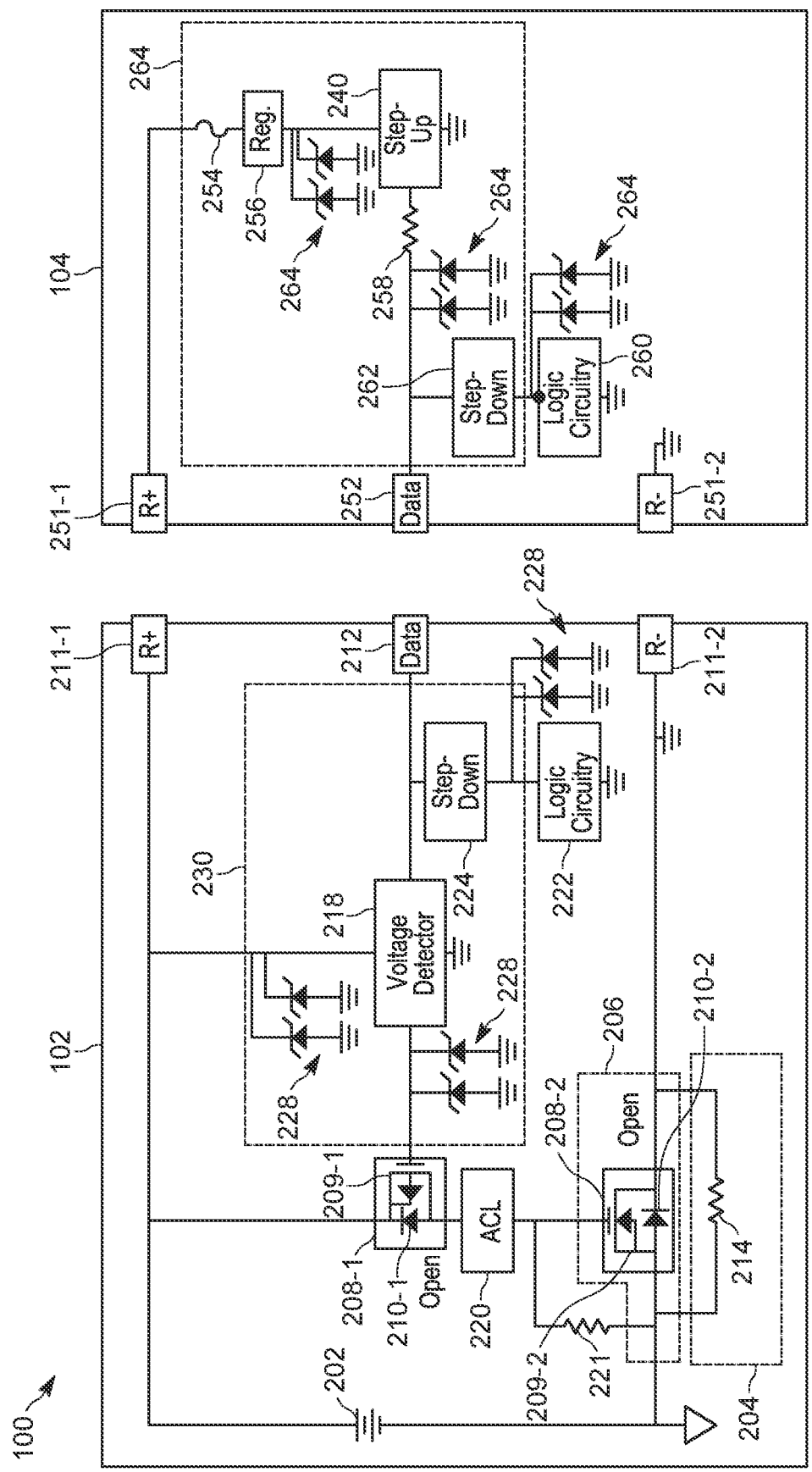
FIG. 2 is a device diagram showing an example structure of the battery and a battery-powered device of FIG. 1.

Attention is next directed to FIG. 2, which depicts a schematic block diagram of an example of the battery 102 and the device 104, when detached from each other.

As depicted in FIG. 2, the battery 102 comprises: a cell 202; a low-power circuit 204; a high-power circuit 206; at least one switch 208-1, 208-2 (e.g. comprising a pair of switches 208-1, 208-2 (e.g. comprising respective field-effect transistors (FETs) 209-1, 209-2, and respective diodes 210-1, 210-2), described in more detail), and an interface comprising battery contacts 211-1, 211-2 and a data interface 212. The switches 208-1, 208-2 are interchangeably referred to hereafter, collectively, as the switches 208 and, generically, as a switch 208. This convention will be used throughout the present specification. For example, the FETs 209-1, 209-2 are interchangeably referred to hereafter, collectively, as the FETs 209, and, generically, as a FET 209, and the diodes 210-1, 210-2 are interchangeably referred to hereafter, collectively, as the diodes 210, and, generically, as a diode 210. However, for clarity, the switches 208-1, 208-2 are further respectively referred to hereafter, as the first switch 208-1 and the second switch 208-2. Similarly, the FETs 209-1, 209-2 are further respectively referred to hereafter, as the first FET 209-1 and the second FET 209-2. Similarly, the diodes 210-1, 210-2 are further respectively referred to hereafter, as the first diode 210-1 and the second diode 210-2.

The battery contacts 211-1, 211-2 are interchangeably referred to hereafter, collectively, as the battery contacts 211 and, generically, as a battery contact 211. As depicted, the battery contact 211-1 comprises a positive contact, and is labeled "R+", the battery contact 211-2 comprises a negative contact, and is labeled "R−". Hence, the battery contact 211-1 may connect to a high side of the cell 202, while the battery contact 211-2 connects to a low side of the cell 202 (e.g. which, as depicted, may be connected to a local ground).

The cell 202 may comprises a lithium ion cell but may be any suitable type of cell including, but not limited to, one or more lithium ion cells.

The low-power circuit 204 is generally configured to output power from the cell 202 to the battery-powered device 104 via the battery contacts 211. While the low-power circuit 204 is depicted as a passive circuit (e.g. including a resistor, described below) in other examples the low-power circuit 204 may comprise an active circuit and may further comprise a current-limiting circuit (e.g. an integrated circuit) which limits current of the low-power circuit 204. Regardless of whether the low-power circuit 204 is active or passive, as depicted, when the at least one switch 208 is open (e.g. both the switches 208-1, 208-2 are open), the low-power circuit 204 is understood to be connected in series with the cell 202 and the battery contacts 211 to provide power to the device 104.

The high-power circuit 206 is generally configured to output a higher power to the battery contacts 211, relative to the low-power circuit 204. For example, as depicted, when the at least one switch 208 is closed (e.g. see FIG. 4), the high-power circuit 206 is understood to be connected in series with the cell 202 (e.g. and in parallel with the low-power circuit 204) and the battery contacts 211 to provide a power to the device 104 that is higher than when the at last one switch 208 is open and the high-power circuit 206 is disconnected from the battery contacts 211 (e.g. and power is provided via the low-power circuit 204 without the high-power circuit 206), as described in more detail below.

For example, the battery 102 may be generally configured to output power on the battery contacts 211 at a voltage that is referred to hereafter as a battery voltage. A value of the battery voltage may depend on whether the high-power circuit 206 is connected to the battery contacts 211, or not. Regardless, when the at least one switch 208 is open, the power output on the battery contacts 211 via the low-power circuit 204 is at a battery voltage that is at a current low enough to prevent and/or reduce and/or eliminate sparking, but is not generally high enough to fully power the device 104, and/or to render the device 104 fully operational, other than as described below. However, when the at least one switch 208 is closed, the power being output on the battery contacts 211 via the high-power circuit 206 is at a battery voltage that is at a current high enough to generally power the device 104, and/or render the device 104 fully operational.

For example, as depicted, the low-power circuit 204 comprises a resistor 214, and the high-power circuit 206 has an absence of resistors, and/or other resistive (and/or inductance) devices, other than any resistance provided by the second FET 209-2 of the second switch 208-2 (e.g. which may be in a range of 10 milliohms range, and the like when turned on and/or closed). For example, as depicted, the second switch 208-2 may be a component of the high-power circuit 206. Put another way, the high-power circuit 206 is understood to have lower resistance, and the like, than the low-power circuit 204 such that, when the high-power circuit 206 and the low-power circuit 204 are connected in parallel, current generally flows predominantly through the high-power circuit 206 due to the relative lower resistance of the high-power circuit 206 as compared to the low-power circuit 204.

In particular, a resistance of the resistor 214 may be selected such that power output by the low-power circuit 204 may be current-limited to less than a given current, such as 250 mA, or lower, which may prevent, and/or reduce, and/or eliminate sparking at the battery contacts 211, for example when connecting to respective battery contacts at the device 104, described in more detail below. Alternatively, and/or in addition, the low-power circuit 204 may comprise a current-limiting device that limits current to less than a given current, such as 250 mA.

In contrast, as the high-power circuit 206 is generally absent of resistors (e.g. other than resistance provided by the first FET 209-1), and/or has a lower resistance than the low-power circuit 204, power output by the high-power circuit 206, to the battery contacts 211, is higher relative to the low-power circuit 204. For example, a battery voltage and current of power output by the high-power circuit 206 may comprise an operating voltage and an operating current of the device 104 that renders the device 104 fully operational, and the like.

In general, the at least one switch 208 is configured to connect and disconnect the high-power circuit 206 to the battery contacts 211. In a default state, as depicted, the at least one switch 208 is open (e.g. both switches 208-1, 208-2 are indicated as being "OPEN"), and connects the low-power circuit 204 to the battery contacts 211 and disconnects the high-power circuit 206 from the battery contacts 211. However, when the at least one switch 208 is closed, the at least one switch 208 connects the high-power circuit 206 to the battery contacts 211 (e.g. in parallel with low-power circuit 204).

Put another way, the at least one switch 208 is to connect and disconnect the high-power circuit 206 to the battery contacts 211, the low-power circuit 204 connected to the battery contacts 211 when the at least one switch 208 disconnects the high-power circuit 206 from the battery contacts 211, to output a battery voltage to the battery contacts 211 at a current low enough to prevent sparking, as controlled by selection of a suitable resistance of the resistor 214 (e.g. and/or via a current limiting circuit of the low-power circuit 204).

More detailed operation of the switches 208-1, 208-2 are next described.

As depicted, each of the switches 208-1, 208-2 comprise a respective FET 209 and a respective diode 210 connected in parallel. The respective diodes 210 are to limit directions of current-flow. For example, as depicted, the first diode 210-1 of the first switch 208-1 limits current-flow to a direction away from the second switch 208-2, and/or towards the battery contact 211-1. Hence, when the first switch 208-1 is open (e.g. by way of the first FET 209-1 being open and/or being switched OFF), current cannot flow through the first switch 208-1 from the cell 202 to the second switch 208-2 (or a current-limiting circuit 220, described below). However, a source and drain of the first FET 209-1 of the first switch 208-1 are on opposite sides of the first diode 210-1, such that, when the first FET 209-1 is closed (e.g. and/or switched on), the first diode 210-1 is bypassed and current may flow through the first switch 208-1 via the first FET 209-1.

Similarly, as depicted, the second diode 210-2 of the second switch 208-2 limits current-flow to a direction away from the cell 202 and/or towards the battery contact 211-2. Hence, when the second switch 208-2 is open (e.g. by way of the second FET 209-2 being open and/or being switched OFF), current cannot flow through the second switch 208-2 from the battery contact 211-2 through the high-power circuit 206 (or is so low as to effectively disable the high-power circuit 206). However, a source and drain of the second FET 209-2 of the second switch 208-2 are on opposite sides of the second diode 210-2, such that, when the second FET 209-2 is closed, the second diode 210-2 is bypassed and current may flow through the second switch 208-2 via the second FET 209-2, and hence through the high-power circuit 206.

Put another way, the diode direction of the second diode 210-2 of the second switch 208-2 generally ensures that when the high-power circuit 206 is disconnected (e.g. by way of the second FET 209-2 being open and/or being switched OFF), the second diode 210-2 of the second switch 208-2 blocks current-flow through the high-power circuit 206 (e.g. but not through the low-power circuit 204).

Furthermore, as depicted, the second switch 208-2 may be incorporated into the high-power circuit 206. While in such examples, the second diode 210-2 is "connected" to the battery contact 211-2, it is understood that the term "connect", as used herein, generally refers to connecting a component (e.g. the high-power circuit 206) in a manner that renders the component operational, and/or the term "connect", as used herein, generally refers to connecting a component (e.g. the high-power circuit 206) in a manner that enables current to flow through the component. Conversely, the term "disconnect", as used herein, generally refers to disconnecting a component (e.g. the high-power circuit 206) in a manner that disables the component, and/or the term "disconnect", as used herein, generally refers to disconnecting a component (e.g. the high-power circuit 206) in a manner that disables current to flow through the component.

As depicted, the first FET 209-1 of the first switch 208-1 may comprise a PFET (p-channel FET and/or MOSFET (metal-oxide on semiconductor FET)) and the second FET 209-2 of the second switch 208-2 may comprise an NFET (n-channel FET and/or MOSFET). However, the switches 208 may comprise any suitable components and/or have any suitable structure (e.g. that may, or may include, the diodes 210).

The battery 102 may further comprise, as depicted a current-limiting circuit 220 (e.g. as depicted, an active current limiting (ACL)) located between the switches 208-1, 208-2. The current-limiting circuit 220 is generally connected to the gate of the second switch 208-2. In particular, when the first switch 208-1 is closed, the current-limiting circuit 220 is turned on, as the first switch 208-1 connects the current-limiting circuit 220 to the cell 202 (e.g. bypassing the first diode 210-1). When the current-limiting circuit 220 is turned on, power is provided to the gate of the second FET 209-2 of the second switch 208-2, by the current-limiting circuit 220, causing the second FET 209-2 to close, to bypass the second diode 210-2 of the second switch 208-2 and connect the high-power circuit 206 to the battery contacts 211. Hence, the high-power circuit 206 becomes a path of least resistance compared to the low-power circuit 204 connected in parallel with the high-power circuit 206, thereby maximizing power output to the battery-powered device 104 such that the battery-powered device 104 may become fully operational. However, the current-limiting circuit 220 may be optional and, the first switch 208-1 is closed, the gate of the second FET 209-2 of the second switch 208-2 is closed by power from the cell 202, via the first switch 208-1, that may not be current limited. Alternatively, the current-limiting circuit 220 may be at any suitable location of the battery 102; for example, while as depicted the current-limiting circuit 220 is located at the drain of the first FET 209-1 of the first switch 208-1, the current-limiting circuit 220 may located at the source of the first FET 209-1 of the first switch 208-1; however, the current-limiting circuit 220 being located at the drain of the first FET 209-1 of the first switch 208-1 may cause the current-limiting circuit 220 to be turned off when the first switch 208-1 is closed, thereby conserving power at the battery 102.

Put another way, when the first switch 208-1 is closed, the first switch 208-1 provides power to the current-limiting circuit 220 to enable the current-limiting circuit 220 to control the second FET 209-2 of the second switch 208-2 (e.g. the current-limiting circuit 220 is connected to the gate of the second FET 209-2 of the second switch 208-2, and may hence turn the second FET 209-2 and/or the second switch 208-2 on). When the current-limiting circuit 220 is enabled by way of the first switch 208-1 providing power thereto, the current-limiting circuit 220 provides a signal to the gate of the second FET 209-2 of the second switch 208-2 which causes the second FET 209-2 to close, and hence, the second switch 208-2 closes.

As the low-power circuit 204 and the high-power circuit 206 are connected in parallel, when the current-limiting circuit 220 is enabled via the switch 208-1 closing and/or being turned on, and the switch 208-2 closes and/or is turned on, the high-power circuit 206, the high-power circuit 206 is understood to be enabled and connected to the battery contacts 211, and current of the battery 102 generally flows through the low-power circuit 204. Conversely, when switches 208-1, 208-2 are both disabled and/or closed, then the high-power circuit 206 is effectively disabled and/or disconnected from the battery contacts 211, (e.g. the second FET 209-2, when open, has a very high resistance as compared to the low-power circuit 204), and current of the battery 102 generally flows through the low-power circuit 204.

Hereafter, for simplicity, the switches 208 will be referred to as being closed or open, and the high-power circuit 206 will be referred to as being respectively connected or disconnected to the battery contacts 211, though it is understood that such closing and opening, and such connecting or disconnecting, occur as described herein.

As depicted, to control the at least one switch 208, the battery 102 further comprises a voltage detector 218. The voltage detector may comprise a voltage comparator, and is hence connected to the data interface 212, and to one of the battery contacts 211 (e.g. the battery contact 211-1 on a high side of the cell 202) to compare a voltage difference therebetween. Put another way, a voltage comparator, of the voltage detector 218 may be to compare a voltage on the data interface 212 to the battery voltage on the battery contacts 211. As will be explained hereafter, a voltage on the data interface 212 is generally output by the device 104 (e.g. when the battery 102 and the device 104 mate) and hence is generally referred to hereafter as an output voltage. Hence, the voltage detector 218 may generally detect a voltage difference between the battery voltage at the battery contacts 211, and the output voltage at the data interface 212.

However, the voltage detector 218 may comprise any suitable components and/or circuitry that enable the voltage detector 218 to: detect a battery voltage on the battery contacts 211; detect an output voltage on the data interface 212; when the output voltage is greater than the battery voltage, control the at least one switch 208 to connect the high-power circuit 206 to the battery contacts 211; and when the output voltage is below (e.g. less than) the battery voltage, control the at least one switch to disconnect the high-power circuit 206 from the battery contacts 211.

Hence, for example, when the voltage detector 218 detects an output voltage on the data interface 212 that is greater than a battery voltage being output by the battery 102 at the battery contacts 211, the voltage detector 218 may provide power to the gate (e.g. of the first FET 209-1) of the first switch 208-1 to close the gate and connect the high-power circuit 206 to the battery contacts 211. Furthermore, when the voltage detector 218 provides power to the gate of the first switch 208-1, and the gate closes, power is also provided to the gate (e.g. of the second FET 209-2) of the second switch 208-2 (e.g. via the current-limiting circuit 220) to close the gate to bypass the low-power circuit 204 (e.g. connect the high-power circuit 206 in parallel with the low-power circuit 204), and connect the cell 202 to the battery contacts 211, in series with the high-power circuit 206.

Components of the device 104 that provide an output voltage on the data interface 212 that is greater than a battery voltage being output by the battery 102 at the battery contacts 211, are described in more detail below.

For completeness, other components of the battery 102 are next described.

As depicted, the battery 102 may comprise a resistor 221 that connects a low side of the cell 202 (e.g. that is connected to a local ground) to between the current-limiting circuit 220 and the second switch 208-2 (e.g. the gate of the second FET 209-2 of the second switch 208-2). A resistance of the resistor 221 is generally selected to ensure that the gate of the second FET 209-2 of the second switch 208-2 is fully turned on or off (e.g. the gate of the second FET 209-2 of the second switch 208-2 is pulled high or low by power and/or voltage supplied by the resistor 221).

As depicted, the battery 102 may comprise logic circuitry 222 and voltage step-down circuitry 224. The logic circuitry 222 may comprise integrated circuits, one-wires devices, and the like, to provide any suitable functionality of the battery 102, which may include, but is not limited to a current-limiting circuit of the low-power circuit 204, a memory component (e.g. storing information about the battery 102), a battery monitor (e.g. that monitors charge and/or current and/or voltage of the battery 102, and like), any other suitable integrated circuits, and the like.

An input of the voltage step-down circuitry 224 is connected to the data interface 212, and an output of the voltage step-down circuitry 224 is connected to the logic circuitry 222. The voltage step-down circuitry 224 is generally to: provide data signals received via the data interface 212 at the output voltage to the logic circuitry 222 at a voltage lower than the output voltage (e.g. which may be at an operating voltage of the logic circuitry 222). In some examples the voltage step-down circuitry 224 may comprise a level-shifter, and the like. Hence, the voltage step-down circuitry 224 isolates the logic circuitry 222 from the output voltage on the data interface 212, which may be higher a voltage at which the logic circuitry 222 operates (e.g. such as the battery voltage). However the voltage step-down circuitry 224 enables data signals to be received at the logic circuitry 222 on the data interface 212 while protecting the logic circuitry 222 from higher voltages on the data interface 212. In some examples, the logic circuitry 222 is powered by suitable connections (not depicted) to the cell 202, however the logic circuitry 222 may alternatively be powered via power received on the data interface 212, stepped down by the voltage step-down circuitry 224 (e.g. via suitable connections, not depicted).

As depicted, the battery 102 may further comprise: one or more isolation circuits 228 to protect components of the battery 102 from the output voltage on the data interface 212 when the output voltage is greater than the battery voltage output on the battery contacts 211. For example as depicted, the one or more isolation circuits 228 may comprise voltage clamp circuits and/or Zener clamp circuits (e.g., comprising Zener diodes), and the like. As depicted, there are isolation circuits 228 between the voltage detector 218 and the first switch 208-1, between the voltage detector 218 and the battery contact 211-1 (e.g. and/or the cell 202), and between the logic circuitry 222 and the voltage step-down circuitry 224. In general, the one or more isolation circuits 228 may ensure that components of the battery 102 outside an isolated region 230 are not exposed to the output voltage of the data interface 212 such that, for example, the battery contacts 211-1 remain at a battery voltage output by the cell 202 (e.g. via the low-power circuit 204 or the high-power circuit 206) and is not raised to the output voltage of the data interface 212 which is generally higher than the battery voltage.

Indeed, the isolated region 230 may comprise an "infallible" isolated space that may be required by certain HAZLOC specifications. Hence, put another way, the battery 102 may further comprise an isolated region 230, within which the voltage detector 218 is located, and one or more isolation circuits 228 to isolate the output voltage on the data interface 212 to the isolated region 230. As depicted, the voltage step-down circuity 224 is also located in the isolated region 230.

The battery 102 may further comprise other features; for example, as depicted, the battery 102 is grounded (e.g. to a local ground) at various suitable locations.

With attention now directed to the device 104, the device 104 comprises voltage step-up circuitry 240, battery contacts 251-1, 251-2 and a data interface 252.

The battery contacts 251-1, 251-2 are interchangeably referred to hereafter, collectively, as the battery contacts 251 and, generically, as a battery contact 251. As depicted, the battery contact 251-1 comprises a positive contact, and is labeled "R+", the battery contact 251-2 comprises a negative contact, and is labeled "R−".

In general, the battery contacts 211 of the battery 102, and the battery contacts 251 of the device 104 are generally configured (e.g. physically located) such that, when the battery 102 and the device 104 mate, the battery contacts 211 of the battery 102, and the battery contacts 251 of the device 104 are in contact, such that the battery 102 provides power to the device 104. In particular, the battery contact 251-1 may connect to a respective "high" battery contact 211-1 of the battery 102, while the battery contact 251-2 may connect to a respective "low" battery contact 211-2 of the battery 102, the battery contact 251-2 connected to a ground of the device 104 (e.g. a local ground, which may connect to a local ground of the battery 102 when mated).

Similarly, the data interface 212 of the battery 102, and the data interface 252 of the device 104 are generally configured (e.g. physically located) such that, when the battery 102 and the device 104 mate, the data interface 212 of the battery 102, and the data interface 252 of the device 104 are in contact, such that the voltage step-up circuitry 240 of the device 104 may provide an output power to the voltage detector 218 of the battery 102. It is further understood that when the battery 102 and the device 104 mate, and the data interfaces 212, 252 are in contact, the battery 102 and the device 104 may exchange data signals with each other via the data interfaces 212, 252.

As depicted, the voltage step-up circuitry 240 is connected to the battery contact 251-1 via a fuse 254 and a regulator 256 (e.g. a low-dropout regulator), described in more detail below, though the fuse 254 and/or the regulator 256 may be optional. Hence, the voltage step-up circuitry 240 is understood to receive power from the battery 102 via the battery contact 251-1 (e.g. the voltage step-up circuitry 240 further being connected to a ground, such as a local ground, to which the battery contact 251-2 is also connected), when the battery 102 and the device 104 are mated.

An output of the voltage step-up circuitry 240 is connected to the data interface 252 (e.g. via an optional resistor 258, whose resistance may be selected to control a current output to the data interface 252).

The voltage step-up circuitry 240 is generally to, when the battery 102 and the device 104 are mated: receive, on the battery contacts 251, power from the low-power circuit 206 at a battery voltage output by the battery 102 (e.g. via the low-power circuit 204, for example when the battery 102 and the device 104 are first mated and/or turned on); and output an output voltage, greater than the battery voltage, on the data interface 252 for detection by the voltage detector 218.

Hence, when the battery 102 and the device 104 are mated (e.g. during a battery swap at the device 104), the at least one switch 208 at the battery 102 is in a state (e.g. closed) such that the battery 102 initially outputs power to the device 104 via the low-power circuit 204, and specifically to the voltage step-up circuitry 240, at a lower power than when the high-power circuit 204 is connected via the at least one switch 208.

However, power from the battery 102 in this state generally powers the voltage step-up circuitry 240, and the voltage step-up circuitry 240 steps up the battery voltage from the battery 102 to a higher output voltage, which is output to the data interface 252, and hence also the data interface 212 at the battery 102, and to the voltage detector 218. The voltage detector 218 detects that the output voltage from the voltage step-up circuitry 240 is greater than the battery voltage output by the battery 102, and closes the first switch 208-1, which in turn closes the second switch 208-2 (e.g. via the current-limiting circuit 220), thereby connecting the high-power circuit 206 to the battery contacts 211, and which generally increases the power output to the device 104 (e.g. relative to when power is output to the device 104 via the low-power circuit 204). Thereafter, the device 104 proceeds to operate normally, as the power output to the device 104, from the battery 102 via the high-power circuit 206, may be at a battery voltage and current that may be a "normal" voltage and a "normal" current for powering the device 104 (e.g. which may render the device 104 fully operational, prior to which the device 104 may be only partially operational, for example to provide the output voltage at the data interface 252).

As such, when the battery 102 is inserted into the device 104 in a HAZLOC location, initially a battery voltage of a relatively lower power is provide at the battery contacts 211 and, when the battery contacts 211, 251 and the data interfaces 212, 252 mate, the voltage step-up circuitry 240 provides a signal (e.g. an output voltage) to the battery 102 via the data interfaces 212, 252 to cause the power output to the device 104 by the battery 102 to increase.

Further details of the device 104 are now described.

In particular, the device 104 comprise may comprise a radio (e.g. a HAZLOC radio), and the voltage step-up circuitry 240, may include, but is not limited to, a charge pump that is generally to provide power to a frequency generating unit (FGU), not depicted, for radio frequency synthesis at the radio.

As depicted, the device 104 may further comprise logic circuitry 260, which may comprise any suitable combination of processors, digital signal processors, transceivers, integrated circuits, one-wire devices, and the like, for implementing functionality of the device 104, which may include, but is not limited to communicating with other radios (e.g. presuming the device 104 comprises a radio) on channels and/or talkgroups, and the like.

As depicted, the device 104 may further comprise voltage step-down circuitry 262, which may be similar to the voltage step-down circuitry 224 of the battery 102, and may comprise a level shifter. An input of the voltage step-down circuitry 262 is connected to an output of the voltage step-up circuitry 240, and the data interface 252, and output of the voltage step-down circuitry 262 is connected to the logic circuitry 260. The voltage step-down circuitry 262 generally is to: provide data signals, received via the data interface 252, to the logic circuitry 260 at a voltage lower than the output voltage (e.g. which may be at an operating voltage of the logic circuitry 260), and the output voltage may be higher a voltage at which the logic circuitry 260 operates; however the voltage step-down circuitry 262 still enables data signals to be received at the logic circuitry 260 on the data interface 252. In some examples, the logic circuitry 260 is powered by suitable connections (not depicted) to the battery contacts 251, however the logic circuitry 260 may alternatively be powered via power received from the voltage step-up circuitry 240, stepped down by the voltage step-down circuitry 262 (e.g. via suitable connections, not depicted).

Hence, data signals may be exchanged between the logic circuitry 222, 260, of the battery 102 and the device 104, via the data interfaces 212, 252, with the respective voltage step-down circuitry 224, 262 protecting the respective logic circuitry 222, 260 from the output voltage output by the voltage step-up circuitry 240.

As depicted, the device 104 may further comprise: one or more isolation circuits 264 to protect components of the device 104 from the output voltage of the voltage step-up circuitry 240. For example as depicted, the one or more isolation circuits 264 may comprise voltage clamp circuits and/or Zener clamp circuits (e.g., comprising Zener diodes), and the like. As depicted, there are isolation circuits 264 between the voltage step-up circuitry 240 and the regulator 256, between the voltage step-up circuitry 240 and the data interface 252, and between the logic circuitry 260 and the voltage step-down circuitry 262. In general, the one or more isolation circuits 264 may ensure that components of the device 104 outside an isolated region 266, are not exposed to the output voltage of the voltage step-up circuitry 240

Indeed, the isolated region 266 may comprise an "infallible" isolated space that may be required by certain HAZLOC specifications. Put another way, the device 104 may comprise an isolated region 266, within which the voltage step-up circuitry 240 is located, and one or more isolation circuits 264 to isolate the output voltage on the data interface to the isolated region 266. As depicted, the voltage step-down circuity 262 is also located in the isolated region 266.

The device 104 may further comprise other features; for example, as depicted, the device 104 is grounded (e.g. to a local ground) at various suitable locations.

Furthermore, the regulator 256 may regulate the battery voltage received at the battery contacts 251, and the fuse 254 may protect the device 104 from power surges from the battery 102. Hence, the fuse 254 and the regulator 256 are also located in the "infallible" isolated space/isolated region 266.

While not depicted, the device 104 may include any other suitable components which may include, but is not limited to, a display screen, one or more input devices, one or more notification devices (e.g. light emitting diodes), a speaker, a microphone, and the like.

Figure 3:
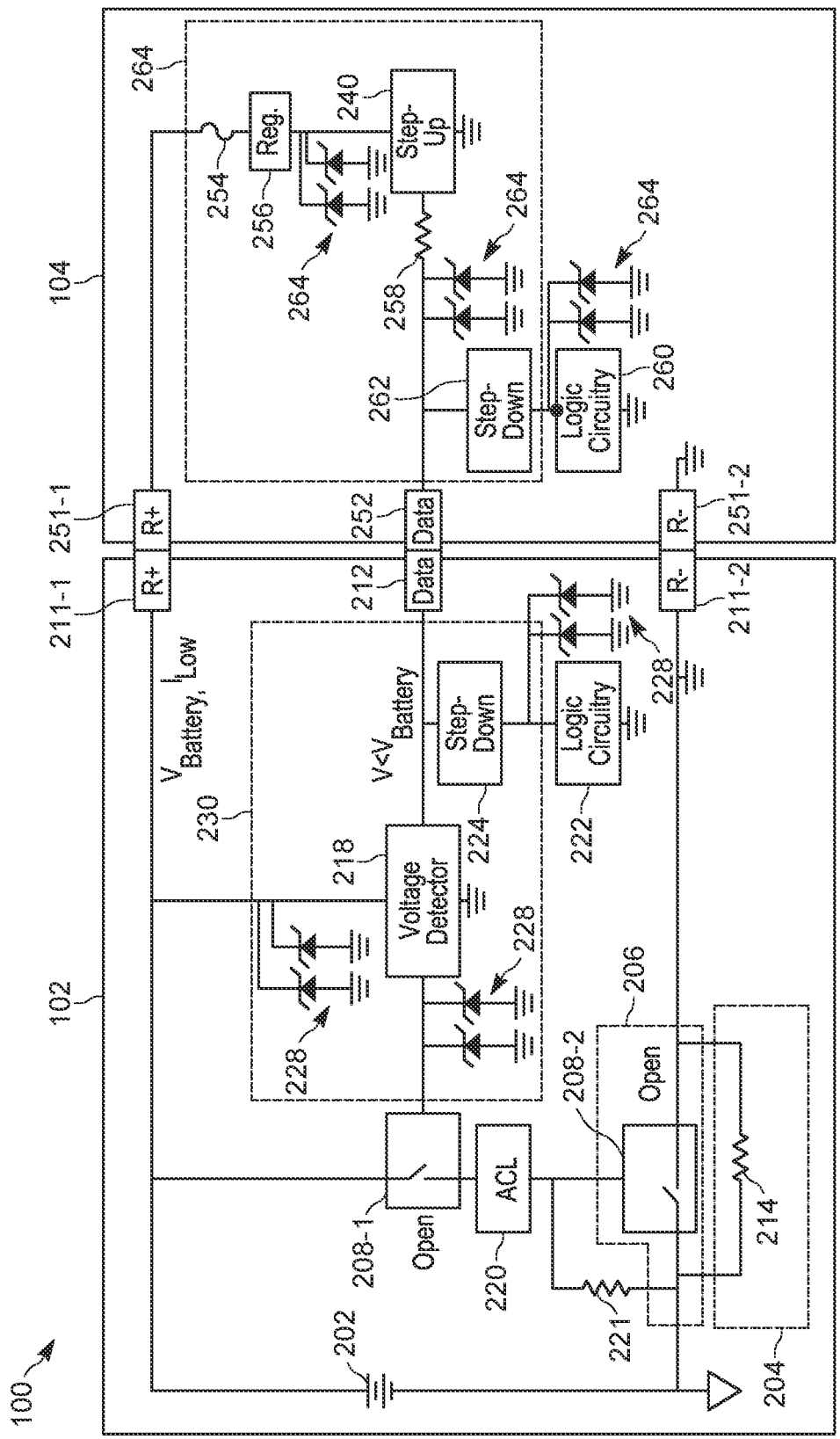
FIG. 3 is a device diagram showing an example operation of the battery and a battery-powered device of FIG. 1, when mated, and with switches of the battery open.
Figure 4:
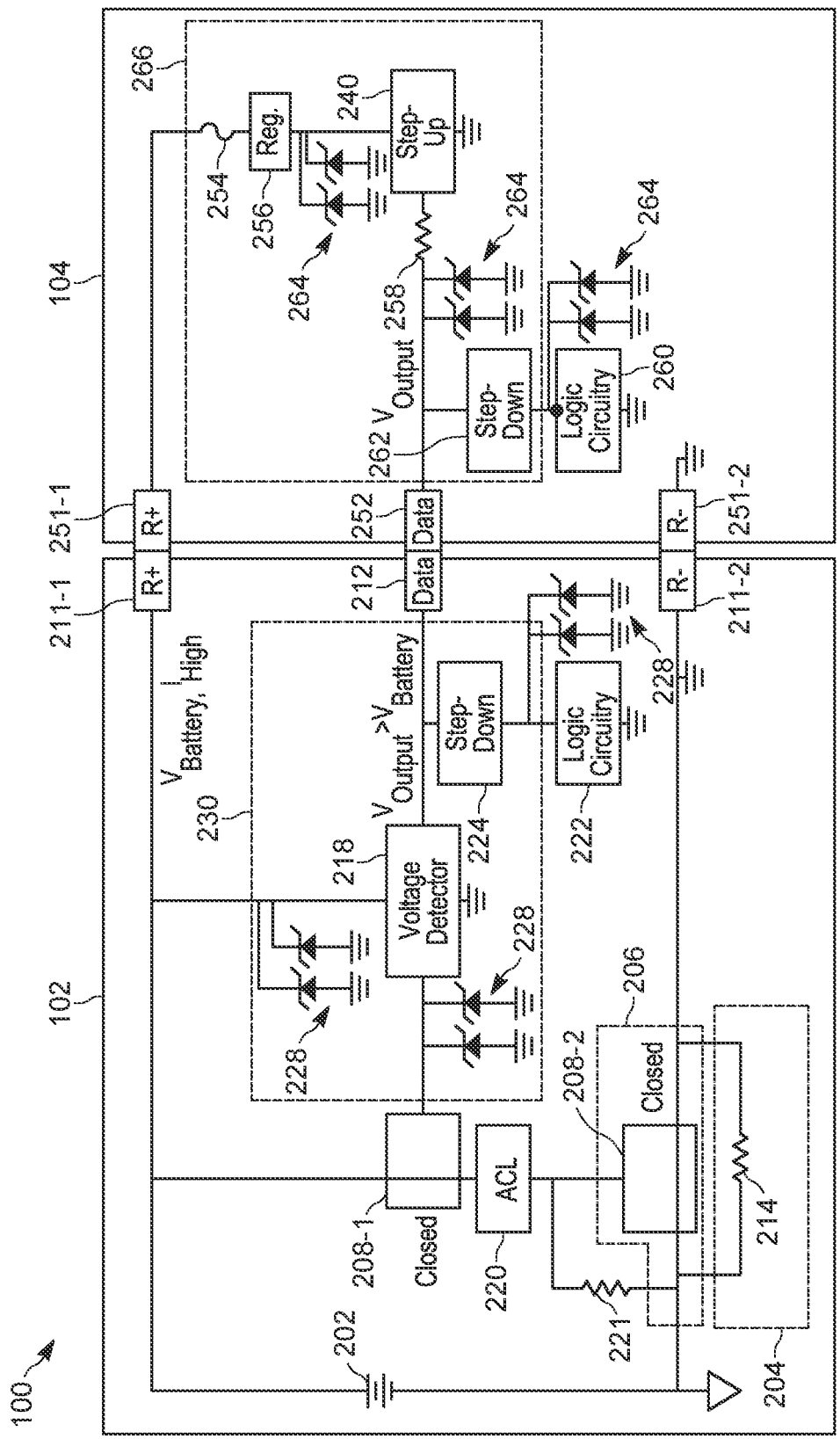
FIG. 4 is a device diagram showing an example operation of the battery and a battery-powered device of FIG. 1, when mated, and with switches of the battery closed.

Attention is next directed to FIG. 3 and FIG. 4 which depict operation of the system 100 when the battery 102 and the device 104 mate. For illustrative purposes, in FIG. 3 and FIG. 4, details of the switches 208-1, 208-2 are replaced with a simple illustration of a generic switch that may be open, as in FIG. 3, or closed, as in FIG. 4.

With attention first directed to FIG. 3, in contrast to FIG. 1, the battery contacts 211, 251 of the battery 102 and the device 104 are in contact, and the data interfaces 212, 252 are in contact. Furthermore the switches 208 are open and hence power output by the battery 102 is via the low-power circuit 204 at a battery voltage, $V_{Battery}$, and a low current, $I_{Low}$, that may be less than 250 mA to prevent and/or reduce and/or eliminate sparking at the battery contacts 211, 251. Furthermore, initially, until the voltage step-up circuitry 240 powers on, voltage output on the data interfaces 212, 252 may be zero and/or as depicted, at a voltage "V" that is less than the battery voltage.

However, with attention next directed to FIG. 4, when the voltage step-up circuitry 240 powers on via the received battery voltage, $V_{Battery}$, and the low current, $I_{Low}$, the voltage step-up circuitry 240 outputs a voltage, $V_{Output}$, on the data interfaces 212, 252 that is higher than the battery voltage, $V_{Battery}$. The voltage detector 218 detects that the output voltage on the data interfaces 212, 252 is higher than the battery voltage, $V_{Battery}$, and closes the switches 208. Hence power output by the battery 102 is via the high-power circuit 204 increases, and is, for example at a battery voltage, $V_{Battery}$, and a high current, $I_{High}$, that is higher than the low current, $I_{Low}$, of FIG. 3.

It is further understood that, when the system 100 is turned off, for example via a switch (not depicted) at the device 104, the voltage step-up circuitry 240 may stop outputting a voltage on the data interfaces 212, 252 that is higher than the battery voltage, and the voltage detector 218 responsively opens the switches 208, such that the battery 102 is in a state for removal, similar to as depicted in FIG. 1 and/or FIG. 3, as the high-power circuit 206 is disconnected from the battery contacts 211.

It is further understood that the device 104 may be placed in a state where the voltage step-up circuitry 240 does not output a voltage on the data interface 252, for example to enable mating with batteries that lack the voltage detector 218 and the at least one switch 208 of the battery 102, such that the device 104 is backwards compatible with batteries lacking such components. In some examples, the device 104 may be placed in such a state via a menu system provided at a display screen (not depicted) of the device 104, and interaction with a suitable input device (not depicted), by an operator of the device 104, with implementation of such a state controlled by the logic circuitry 260.

Figure 5:
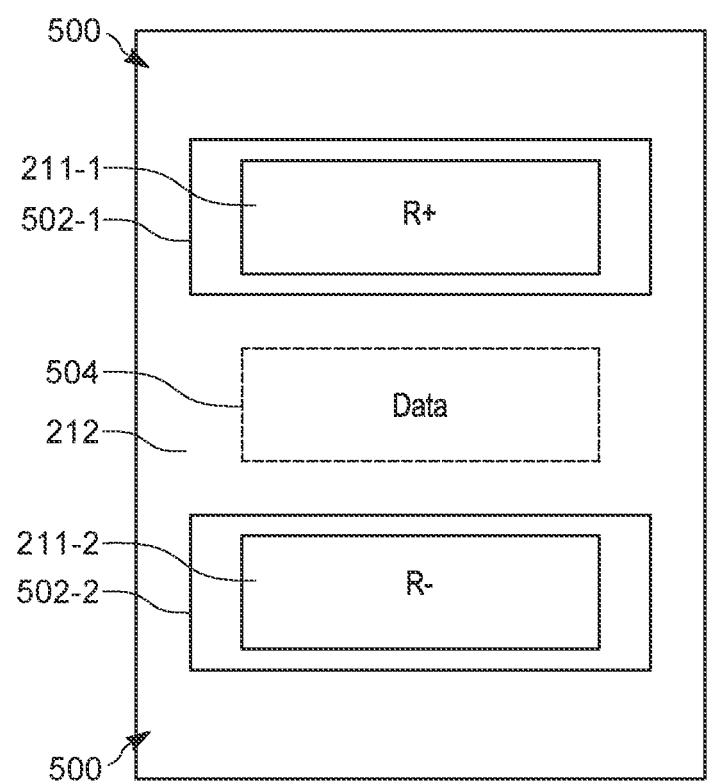
FIG. 5 depicts an example configuration of a data interface and battery contacts of the battery of the system of FIG. 1.

Attention is next directed to FIG. 5 which depicts one example of a physical layout of the battery contacts 211-1, 211-2 and the data interface 212 of the battery 102, though the battery contacts 211-1, 211-2 and the data interface 212 may have other layouts. Such a layout, however, may assist with reduction of sparking when the battery 102 and the device 104 mate.

In particular, as depicted, the data interface 212 comprises respective conductive regions 500 around the battery contacts 211-1, 211-2, the respective conductive regions 500 electrically isolated from the battery contacts 211-1, 211-2, for example by respective regions of electrical insulator 502-1, 502-2 around the battery contacts 211-1, 211-2.

Put another way, the data interface 212 comprises respective conductive regions 500 around the battery contacts 211-1, 211-2, the respective conductive regions 500 electrically isolated from the battery contacts 211-1, 211-2.

In particular, in these examples, the data interface 212 (e.g. including the respective conductive regions 500) and the battery contacts 211-1, 211-2 comprise respective electrical pads to which respective connectors (e.g. spring-loaded contacts, and the like, among other possibilities) of the data interface 252 and the battery contacts 251-1, 251-2 of the device 104 connect. A region 504 where a respective contact of the data interface 252 of the device 104 may connect to the data interface 212 of the battery 102 is indicated by dashed lines, however such a region 504 is understood to be electrically connected to the conductive regions 500 of remainder of the data interface 212 which surround the battery contacts 211-1, 211-2.

In particular, conductive dust may collect at the data interface 212 and the battery contacts 211-1, 211-2, for example in a hazardous location, and which may hence short the battery contacts 211-1, 211-2 to the data interface 212 across one or more of the regions of electrical insulator 502-1, 502-2. As such, widths of the one or more of the regions of electrical insulator 502-1, 502-2 may be selected to cause such shorting when conductive dust collects at the data interface 212, and may be any suitable dimensions, including, but not limited to, 0.5 mm, 1 mm, 2 mms, among other possibilities. In particular, such widths may be selected heuristically, via measurements of shorting of conductive dust in hazardous locations (which may be simulated in laboratory conditions) across different widths of the regions of electrical insulator 502-1, 502-2 between the data interface 212 and the battery contacts 211-1, 211-2.

In such examples, when the battery 102 is inserted into the device 104, the data interface 212 and one or more of the battery contacts 211-1, 211-2 may short via such conductive dust, which pulls down the voltage on the data interfaces 212, 252 to the battery voltage. Hence, the voltage detector 218 hence does not close the at least one switch 208, as the voltage at the data interface 212 is not greater than the battery voltage on the battery contacts 211 (e.g. the voltage at the data interface 212 is the same as the battery voltage on the battery contacts 211).

As such, power output to the device 104 remains at a low power provided by the low-power circuit 204. In some of these examples, the device 104 may comprise circuitry (which may include, but is not limited to the logic circuitry 260, though such short-detecting circuitry may alternatively be located within the isolated region 266) to detect such a short (e.g. powered by the battery voltage and the low current received from the battery 102 when the at least one switch 208 is open), and provide an error message at the device 104, for example via a notification device, such as a light emitting diode, and the like (e.g. powered by the battery voltage and the low current received from the battery 102 when the at least one switch 208 is open). Regardless, the device 104 may not become functional, which may cause an operator of the system 100 to remove the battery 102 from the device 104 to inspect the data interface 212 and the battery contacts 211-1, 211-2 for conductive dust and remove such conductive dust when present (e.g. and then reinsert the battery 102 into the device 104).

While the configuration of FIG. 5 is described with respect to the data interface 212 and the battery contacts 211-1, 211-2 of the battery 102, the data interface 252 and the battery contacts 251-1, 251-2 of the device 104 may alternatively have such a configuration. In these examples, the data interface 212 and the battery contacts 211-1, 211-2 of the battery 102 may comprise respective connectors (e.g. spring-loaded contacts, and the like, among other possibilities) that respectively connect to, the data interface 252 and the battery contacts 251-1, 251-2 of the device 104.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
    a battery, a battery-powered device, and an interface therebetween comprising battery contacts and a data interface,
    the battery comprising:
        a cell;
        a low-power circuit to output power, from the cell, to the battery-powered device via the battery contacts;
        a high-power circuit to output a higher power to the battery contacts, relative to the low-power circuit;
        at least one switch to connect and disconnect the high-power circuit to the battery contacts, the low-power circuit connected to the battery contacts when the at least one switch disconnects the high-power circuit from the battery contacts; and
        a voltage detector to: detect a battery voltage on the battery contacts; detect, from the battery-powered device, an output voltage on the data interface; when the output voltage is greater than the battery voltage, control the at least one switch to connect the high-power circuit to the battery contacts; and when the output voltage is below the battery voltage, control the at least one switch to disconnect the high-power circuit from the battery contacts,
    the battery-powered device comprising:
        voltage step-up circuitry to: receive, on the battery contacts, power from the low-power circuit at the battery voltage; and output the output voltage, greater than the battery voltage, on the data interface for detection by the voltage detector.

2. The system of claim 1, wherein the battery further comprises: logic circuitry; and voltage step-down circuitry, the voltage step-down circuitry to provide data signals received via the data interface at the output voltage to the logic circuitry at a voltage lower than the output voltage.

3. The system of claim 1, wherein the battery-powered device further comprises: logic circuitry; and voltage step-down circuitry, the voltage step-down circuitry to provide data signals, received via the data interface, to the logic circuitry at a voltage lower than the output voltage.

4. The system of claim 1, wherein the battery further comprises an isolated region, within which the voltage detector is located, and one or more isolation circuits to isolate the output voltage on the data interface to the isolated region.

5. The system of claim 1, wherein the battery-powered device further comprises an isolated region, within which the voltage step-up circuitry is located, and one or more isolation circuits to isolate the output voltage, output by the voltage step-up circuitry, to the isolated region.

6. The system of claim 1, wherein the at least one switch comprises a field-effect transistor.

7. The system of claim 1, wherein the voltage detector comprises a voltage comparator to compare the output voltage received at the data interface to the battery voltage, output on the battery contacts.

8. The system of claim 1, wherein the data interface comprises respective conductive regions around the battery contacts, the respective conductive regions electrically isolated from the battery contacts.

9. The system of claim 1, wherein the voltage step-up circuitry comprises a charge pump.

10. A battery comprising:
 battery contacts;
 a data interface;
 a cell;
 a low-power circuit to output power from the cell via the battery contacts;
 a high-power circuit to output a higher power to the battery contacts, relative to the low-power circuit;
 at least one switch to connect and disconnect the high-power circuit to the battery contacts, the low-power circuit connected to the battery contacts when the at least one switch disconnects the high-power circuit from the battery contacts; and
 a voltage detector to: detect a battery voltage on the battery contacts; detect an output voltage on the data interface; when the output voltage is greater than the battery voltage, control the at least one switch to connect the high-power circuit to the battery contacts; and when the output voltage is below the battery voltage, control the at least one switch to disconnect the high-power circuit from the battery contacts.

11. The battery of claim 10, further comprising: logic circuitry; and voltage step-down circuitry, the voltage step-down circuitry to provide data signals received via the data interface at the output voltage to the logic circuitry at a voltage lower than the output voltage.

12. The battery of claim 10, wherein the battery further comprises an isolated region, within which the voltage detector is located, and one or more isolation circuits to isolate the output voltage on the data interface to the isolated region.

13. The battery of claim 10, wherein the at least one switch comprises a field-effect transistor.

14. The battery of claim 10, wherein the voltage detector comprises a voltage comparator to compare the output voltage received at the data interface to the battery voltage, output on the battery contacts.

15. The battery of claim 10, wherein the data interface comprises respective conductive regions around the battery contacts, the respective conductive regions electrically isolated from the battery contacts.

\* \* \* \* \*